United States Patent [19]

Sugishima et al.

[11] Patent Number: 5,059,293
[45] Date of Patent: Oct. 22, 1991

[54] COATING RESIN COMPOSITION

[75] Inventors: Masami Sugishima; Haruo Nagaoka, both of Hiratsuka, Japan

[73] Assignee: Kansai Paint Co., Ltd., Hyogo, Japan

[21] Appl. No.: 446,770

[22] Filed: Dec. 6, 1989

[30] Foreign Application Priority Data

Dec. 13, 1988 [JP] Japan .................................. 63-314483

[51] Int. Cl.$^5$ ....................... C25D 13/10; B32B 15/08
[52] U.S. Cl. ............................ 204/181.7; 204/181.4; 528/110; 528/111.3; 523/428; 428/418
[58] Field of Search ............... 204/181.7, 181.4, 180.2; 523/403; 524/901; 528/110, 111.3

[56] References Cited

U.S. PATENT DOCUMENTS

| | | | |
|---|---|---|---|
| 3,878,145 | 4/1975 | Güldenpfennig | 528/111.3 |
| 4,331,574 | 5/1982 | Bekooij et al. | 528/111.3 |
| 4,605,690 | 8/1986 | Debroy et al. | 204/181.7 |
| 4,735,989 | 4/1988 | Guioth et al. | 524/548 |
| 4,761,337 | 8/1988 | Guagliardo et al. | 523/420 |
| 4,786,666 | 11/1988 | Cecil et al. | 528/111.3 |
| 5,001,173 | 3/1991 | Anderson et al. | 523/406 |

*Primary Examiner*—John F. Niebling
*Assistant Examiner*—Kishor Mayekar
*Attorney, Agent, or Firm*—Wenderoth, Lind & Ponack

[57] ABSTRACT

A coating resin composition comprising as a main component an epoxy-polyamine resin resulting from the addition of (d) an amine compound having active hydrogen to an epoxy resin obtained by reacting (a) a diepoxide compound with less than 1 equivalent, per equivalent of the diepoxide compound (a), of (b) a bisphenol, said diepoxide compound being obtained by reacting a dihydric dimer alcohol derived from an unsaturated fatty acid or aliphatic unsaturated alcohol having 14 to 24 carbon atoms with an epihalohydrin; and a coating resin composition comprising as a main component an epoxy-polyamine resin resulting from the addition of (d) an amine compound having active hydrogen to an epoxy resin obtained by reacting (a) a diepoxide compound with more than 1 equivalent, per equivalent of the diepoxide compound (a), of (b) a bisphenol and further reacting the product with (c) bisphenol diglycidyl ether, said diepoxide compound being obtained by reacting a dihydric dimer alcohol derived from an unsaturated fatty acid or aliphatic unsaturated alcohol having 14 to 24 carbon atoms with an epihalohydrin.

24 Claims, No Drawings

COATING RESIN COMPOSITION

This invention relates to a novel coating resin composition, and more specifically, to a coating resin composition having improved thick film coatability and corrosion resistance which is particularly suitable for cathodic electrodeposition.

A resin composition comprising a combination of (1) an epoxy-polyamine resin obtained by reacting a resin containing epoxy groups with an amine and (2) a polyisocyanate curing agent blocked with an alcohol described in U.S. Pat. Nos. 3,947,339 and 4,017,438 (corresponding to Japanese Laid-Open Patent Publications No. 93024/1979) is a general example of a resin composition for cathodic electrodeposition. In this composition, a product obtained by increasing the molecular weight of bisphenol A diglycidyl ether using bisphenol A is generally used as the epoxy group-containing resin in order to impart corrosion resistance. A plasticized epoxy resin obtained by introducing a plasticizing modifier such as certain flexible polyesters, polyethers, polyamides, polybutadiene or butadiene/acrylonitrile copolymer is also used.

In the field of electrodeposition coating of automobile bodies or parts, there has recently been an increasing demand for paints which have thick film coatability and a high level of corrosion resistance and give beautiful finishes with good film properties.

If in an attempt to impart thick film coatability in cathodic electrodeposition, the amount of the conventional plasticizing modifier is increased in the epoxy resin, components having low corrosion resistance are incorporated in the resin, and sufficient corrosion resistance cannot be obtained. On the other hand, if the amount of the plasticizing modifier is decreased so as to increase corrosion resistance, the resulting coating composition cannot have thick film coatability.

We have now found that a resin composition having thick film coatability and a high level of corrosion resistance can be obtained by using an epoxy resin prepared by reacting a dihydric dimer alcohol ("dimer alcohol" hereinafter) derived from an unsaturated fatty acid or an aliphatic unsaturated alcohol having 14 to 24 carbon atoms with an epihalohydrin.

Thus, in one aspect of this invention, there is provided a coating resin composition comprising as a main component an epoxy-polyamine resin resulting from the addition of (d) an amine compound having active hydrogen to an epoxy resin obtained by reacting (a) a diepoxide compound with less than 1 equivalent, per equivalent of the diepoxide compound (a), of (b) a bisphenol, said diepoxide compound (a) being obtained by reacting a dihydric dimer alcohol derived from an unsaturated fatty acid or aliphatic unsaturated alcohol having 14 to 24 carbon atoms with an epihalohydrin.

In another aspect, the present invention provides a coating resin composition comprising as a main component an epoxy-polyamine resin resulting from the addition of (d) an amine compound having active hydrogen to an epoxy resin obtained by reacting (a) a diepoxide compound with more than 1 equivalent, per equivalent of the diepoxide compound (a), of (b) a bisphenol and further reacting the product with (c) bisphenol diglycidyl ether, said diepoxide compound (a) being obtained by reacting a dihydric dimer alcohol derived from an unsaturated fatty acid or aliphatic unsaturated alcohol having 14 to 24 carbon atoms with an epihalohydrin.

The coating resin compositions of this invention will be described below in detail.

Diepoxide compound (a)

The dimer alcohol used in the production of the diepoxide compound (a) in this invention can generally be produced by dimerizing an unsaturated fatty acid having 14 to 24 carbon atoms, preferably 18 carbon atoms, and reducing the carboxyl groups of the resulting dimeric acid, or by dimerizing an aliphatic unsaturated alcohol having 14 to 24 carbon atoms, preferably 18 carbon atoms. A typical example of the dimer alcohol is commercially available from Henkel Company (West Germany).

The diepoxide compound (a) is obtained by epoxidizing the resulting dimer alcohol with an epihalohydrin, and contains a plasticizing fatty acid dimer skeleton in its molecule, which is believed to contribute to the imparting of thick film coatability and corrosion resistance to the composition of this invention.

Examples of the unsaturated fatty acids having 14 to 24 carbon atoms include myristo-oleic acid, palmitooleic acid, oleic acid, vaccenic acid, eiconic acid, erucic acid, selacholeic acid, linoleic acid, hiragonic acid, linolenic acid and arachidonic acid. They may be used either singly or in combination. Fatty oils containing these fatty acids may be used. Specific examples of the fatty oils are castor oil, safflower oil, soybean oil, tall oil, beef tallow oil, whale oil, liver oil and fish oil.

Of these, oleic acid and linoleic acid, both having 18 carbon atoms, are especially preferred.

The unsaturated fatty acids are dimerized by known methods, for example by thermally polymerizing them at temperatures around 300° C. in an autoclave using anthraquinone, $SO_2$, an excess of alkali, acidic terra alba, or Lewis acids as a catalyst. Preferably, the resulting dimeric acid is composed substantially of a dimer alone, but may contain a trimer or a polymer and/or the unreacted monomer. The content of such polymers and/or monomer should desirably be not more than 50% by weight, preferably not more than 30% by weight, based on the total amount of the dimerization reaction product.

The reduction of the carboxyl groups of the resulting dimeric acid can also be carried out by known methods, for example, by hydrogenating it at temperatures around 250° C. under a high pressure (200 to 300 $kg/cm^2$) in the presence of copper carbonate or cadmium oxide as a catalyst.

Specific examples of the aliphatic unsaturated alcohols having 14 to 24 carbon atoms are oleyl alcohol, erucyl alcohol, linoleyl alcohol and linolenyl alcohol. They may be used singly or in combination. Of these aliphatic unsaturated alcohols, oleyl alcohol and linoleyl alcohol, both having 18 carbon atoms, are especially preferred.

The aliphatic unsaturated alcohols are dimerized to dimer alcohols. The dimerization can be carried out by known methods, for examle by thermally polymerizing them at temperatures of at least 200° C. for about 4 hours using acid terra alba as a catalyst.

The resulting dimer alcohol is then reacted with an epihalohydrin to form the diepoxide compound (a). This reaction can be easily carried out, for example, by maintaining the reactants at 50 to 80° C. for 2 to 5 hours using sulfuric acid or boron trifluoride as a catalyst, and thereafter treating the reaction product with an alkali such as potassium hydroxide.

Epoxy resin

The epoxy resin in this invention is obtained by reacting the diepoxide compound (a) with the bisphenol (b), or with the bisphenol (b) and the bisphenol diglycidyl ether (c).

Particularly a bisphenol A-type glycidyl ether of the following formula is preferred in view of cost and corrosion resistance.

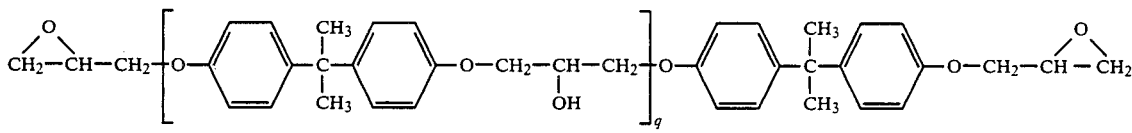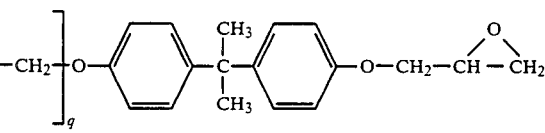

wherein q is a number of 0 to 4.

The reaction for obtaining the epoxy resin may be carried out of known methods, for example, by heating the diepoxide compound (a) and the bisphenol (b), or the diepoxide compound (a), the bisphenol (b) and the bisphenol diglycidyl ether (c), at a temperature of about 50° C. to about 200° C., preferably about 110° C. to about 160° C., usually for about 1 to about 15 hours in the presence of, as a catalyst, a basic amino compound such as dimethylbenzylamine, tributylamine or triethylamine. As required, a solvent may be used in this reaction. Examples include ketones such as methyl ethyl ketone, methyl isobutyl ketone and cyclohexanone, ethers such as butyl Cellosolve, propylene glycol monomethyl ether, diethylene glycol monomethyl ether and hexyl Cellosolve; and benzyl alcohol.

The epoxy resin used in one aspect of the invention can be produced by reacting the diepoxide compound (a) with the bisphenol (b) in less than 1 equivalent, preferably 0.1 to 0.9 equivalent, more preferably 0.5 to 0.75 equivalent, per equivalent of the oxirane groups of the diepoxide compound (a).

The epoxy resin used in the other aspect of the invention is produced by reacting the diepoxide compound (a) with the bisphenol (b) and bisphenol diglycidyl ether (c). In this reaction, the bisphenol (b) is used in less than 1 equivalent per equivalent of the entire oxirane groups and more than 1 equivalent per equivalent of the oxirane groups of the diepoxide compound (a), preferably in 0.3 to 0.9 equivalent, especially 0.6 to 0.75 equivalent, per equivalent of the entire oxirane groups of the diepoxide compound (a) and the bisphenol diglycidyl ether (c). The diepoxide compound (a) may be pre-reacted with the bisphenol (b) and then reacted with the bisphenol diglycidyl ether (c). Alternatively, the diepoxide compound (a), the bisphenol (b) and the bisphenol diglycidyl ether (c) may be simultaneously reacted. Generally, the former is preferred because it permits easier designing and controlling of the resin.

The proportions of the diepoxide compound (a) and the bisphenol diglycidyl ether (c) used are not strictly limited. The mole ratio of the diepoxide compound (a) to the bisphenol diglycidyl ether (c) may be generally from 1:5 to 5:1, preferably from 1:4 to 3:1, more preferably from 1:3 to 2:1.

The bisphenol (b) used in this reaction is typically a compound represented by the following formula

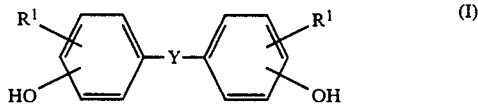

wherein Y represents a direct bond or a lower alkylene group, and $R^1$ represent a hydrogen atom or a lower alkyl group.

Specific examples include bis(4-hydroxyphenyl)-2, 2-propane, bis(4-hydroxyphenyl)-1,1-ethane, bis(4-hydroxyphenyl)-methane, 4,4'-dihydroxy diphenyl ether, 4,4'-dihydroxydiphenylsulfone, bis(4-hydroxyphenyl)-1,1-isobutane and bis(4-hydroxy-3-t-butylphenyl)-2,2-propane. The term "lower", as used herein, means that a group or compound qualified by this term has not more than 6, preferably not more than 4, carbon atoms.

The disphenol diglycidyl ether (c) can be obtained by reacting the above disphenol with an epihalohydrin. For example, it may be a disphenol diglycidyl ether having a number average molecular weight of at least about 320, preferably 340 to 2,000, and an epoxy equivalent of at least about 160, preferably about 170 to 1,000.

The epoxy resins so prepared may have a number average molecular weight of generally 1,200 to 5,000, preferably 1,500 to 3,000, and an epoxy equivalent of 600 to 2,500, preferably 700 to 1,500.

Epoxy-Polyamine Resin

The epoxy-polyamine resin used in this invention can be produced by the addition of an amine compound (d) having active hydrogen to the epoxy resin obtained as above.

The amine compound (d) having active hydrogen may be, for example, an amine compound which has active hydrogen capable of reacting with oxirane groups and can introduce an amino group or a quaternary ammonium salt group into the epoxy resin Examples include aliphatic or alicyclic primary or secondary amines, primary or secondary aralkylamines, alkanolamines and tertiary amine salts. Typical examples are given below.

(1) Compounds obtained by reacting the primary amino group of amine compounds containing one secondary amino group and at least one primary amino group, for example, dialkylenetriamines such as diethylenetriamine, hydroxyalkylaminoalkylamines such as hydroxyethylaminoethylamine and alkylaminoalkylamines such as ethylaminoethylamine and methylaminopropylamine with ketone (such as methyl ethyl ketone and methyl isobutyl ketone), aldehydes (such as formaldehydride and acetamide) or carboxylic acids (such as acetic acid and lactic acid) at a temperature of about 100 to 230° C. to convert the primary amino group into an aldimine, ketimine, oxazoline or imidazoline.

(2) Secondary monoamines, for example dialkylamines such as diethylamine, dialkanolamines such as diethanolamine, di-n-propanolamine and di-isopropanolamine and N-alkylalkanolamines such as N-methylethanolamine and N-ethylethanolamine.

(3) Secondary amino group-containing compounds obtained by reacting monoalkanolamines such as monoethanolamine with dialkyl (meth)acrylamines by the Michael addition reaction.

(4) Compounds obtained by converting the primary amino group of alkanolamines such as monoethanolamine, neopentanolamine, 2-aminopropanol, 3-aminopropanol, and 2-hydroxy-2'(aminopropoxy) ethyl ether into a ketimine by using a ketone such as methyl ethyl ketone or methyl isobutyl ketone.

(5) Salts formed between tertiary amines (for example dialkylalkanolamines such as dimethyl ethanolamine, trialkylamines such as triethylamine, trimethylamine and triisopropylamine, and alkyldialkanolamines such as methyl diethanolamines and organic acids such as acetic acid and lactic acid.

Among the above amine compounds, ketiminization products of dialkylenetriamines, dialkanolamines, N-alkylalkanolamines and monoethanolamines are preferred.

The reaction of the epoxy resin with the amine compound (d) may be carried out, for example, at a temperature of about 30 to about 160° C. in the presence or absence of a catalyst. The addition of the amine compound to the epoxy resin may be carried out simultaneously with the increasing of the molecular weight of the epoxy resin, namely with the reacting of the diepoxide compound (a) with the bisphenol (b) and optionally the bisphenol diglycidyl ether (c).

The amount of the amine compound (d) may be selected so that the amine value of the resulting epoxy-polyamine resin is generally 15 to 100, preferably 20 to 80, more preferably 25 to 65. For this purpose, it is convenient to add the amine compound (d) to the epoxy resin in such proportions that the the mole ratio of the amine compound (d) to the oxirane groups of the epoxy resin becomes 0.6 to 1.0, preferably 0.8 to 0.95.

The epoxy-polyamine resin may further be reacted with reaction reagents, for example a tertiary amine salt, a monocarboxylic acid, a secondary sulfide salt, a monoalcohol or a monoalcohol, to adjust water dispersibility or improve the smoothness of the coated film.

The epoxy-polyamine resin may be rendered crosslinkable in its interior by introducing a crosslinkable functional group such as a blocked isocyanate group, a beta-hydroxycarbamate group, an alpha, beta-unsaturated carbonyl group or an N-methylol group into the resin.

The reaction with the above reaction reagents and the introduction of the crosslinkable functional group may be effected before the addition of the amine compound having active hydrogen to the epoxy resin.

The epoxy-polyamine resin so obtained may be used in combination with an external crosslinking agent. The external crosslinking agent may be a compound having at least two crosslinkable groups per molecule, for example a blocked polyisocyanate, a beta-hydroxycarbamate of a polyamine, a malonic acid ester, methylolated melamine and methylolated urea.

To water-solubilize the epoxy-polyamine resin or render it dispersible in water, the amino groups of the resin are protonized (neutralized) with a water-soluble organic acid such as formic acid, acetic acid or lactic acid and then the resin is dissolved or dispersed in water.

The amount (neutralization value) of the acid used for protonization is not strictly determined. Generally, it is about 5 to 40 KOH mg, preferably 10 to 20 KOH mg, per gram of the resin solids, in view of electrodeposition characteristics of the resulting coating composition.

The aqueous solution or dispersion so obtained is particularly suitable for cathodic electrodeposition coating. As required, a pigment, a solvent, a curing catalyst, and a surface active agent may be added to the aqueous solution or dispersion.

Known methods and apparatus used in conventional cathodic electrodeposition coating may be used in electrodeposition on a substrate from the aqueous solution or dispersion obtained in this invention. Desirably, the substrate is used as a cathode, and a stainless steel or carbon plate is usually employed as an anode. The electrodeposition coating conditions are not particularly limited. Generally, the coating bath is maintained at a temperature of 20 to 30° C., a voltage of 100 to 400 V (preferably 200 to 300 V), and a current density of 0.01 to 3 A/dm$^2$. The time used to pass a current is 1 to 5 minutes, and the area ratio of the anode to the cathode is from 2:1 to 1:2. The distance between the electrodes is 10 to 100 cm. Desirably, the electrodeposition is carried out while the bath is stirred.

The coated film deposited on the substrate (cathode) is washed and then baked at about 140 to about 180° C. to cure it.

The following examples will illustrate the invention more specifically.

All parts and percentages in the following examples are by weight.

PRODUCTION EXAMPLE 1

A reactor equipped with a thermometer, a stirrer, a reflux condenser and a nitrogen gas blowing inlet was charged with 538 parts of dimer alcohol diglycidyl ether (produced by Henkel-Hakusuisha, main component: a diglycidyl ether of an oleyl alcohol dimer) having an epoxy equivalent of about 400, 331 parts of bisphenol A and 36 parts of a methyl isobutyl ketone solution of a ketimine formed between methyl isobutyl ketone and monoethanolamine (available components 80%) while nitrogen gas was being blown into the reactor. The reaction was carried out at 160° C. until the epoxy groups disappeared.

The reactor was further charged with 676 parts of bisphenol A diglycidyl ether having an epoxy equivalent of about 190 and 232 parts of a methyl isobutyl ketone solution of a ketimine formed between monoethanolamine and methyl isobutyl ketone (available components 80%), and the reaction was carried out at 140° C. until the epoxy group concentration reached 0.28 millimole/g. As a result, a solution of an epoxy resin having a number average molecular weight of about 1,500 was obtained.

The epoxy resin solution was diluted and cooled with 365 parts of ethylene glycol monobutyl ether. When the temperature reached 100° C., 100 parts of a methyl isobutyl ketone solution of a methyl isobutyl ketone diketimine of diethylenetriamine (available components 80%) was added, and the reaction was carried out at 100° C. until the rise of the viscosity ceased. A solution of an epoxy-polyamine resin having a solids content of 81% was obtained. This solution was adjusted to a solids concentration of 50% with ethylene glycol monobutyl ether. At this time, the Gardner viscosity of the resin solution at 25° C. was VW.

PRODUCTION EXAMPLE 2

The same apparatus as used in Production Example 1 was charged with 720 parts of the same dimer alcohol diglycidyl ether as used in Production Example 1, 388 parts of bisphenol A and 1 part of dimethylbenzylamine, and they were reacted at 160° C. until the epoxy groups disappeared.

Then, 684 parts of bisphenol A diglycidyl ether having an epoxy equivalent of about 190 was added to the apparatus, and reacted at 160° C. until the epoxy group concentration reached 1.1 millimoles/g. As a result, an epoxy resin having a number average molecular weight of 1800 was obtained.

The resin was diluted and cooled with 400 parts of ethylene glycol monobutyl ether. When the temperature of the solution reached 80° C., 158 parts of diethanolamine and 80 parts of a methyl isobutyl ketone solution of a methyl isobutyl ketone diketimine of diethylenetriamine (available components 80%) were added. The reaction was carried out at 100° C. until the rise of the viscosity ceased. Thus, an epoxy-polyamine resin solution having a solids content of 83% was obtained. When the solution was adjusted to a solids concentration of 50% with ethylene glycol monobutyl ether, the Gardner viscosity (25° C.) of the solution was YZ.

PRODUCTION EXAMPLE 3

(1) Production of dimer alcohol

Dimeric acid having an acid value of about 195 (575 parts; Versadyme #288, tradename for dimeric acid of fatty acids containing linoleic acid, produced by Henkel-Hakusui), 21.6 parts of copper carbonate and 7.2 parts of cadmium oxide were put in a pressure reactor, and maintained at a reaction temperature of 250° C. and a hydrogen pressure of 246 kg/cm$^2$ for 20 minutes. The heating was then stopped, and the reactor was left to stand overnight (by the method of A. J. Pantulu et al. in JAOCS., 41, 511, 1964). The pressure was returned to atmospheric pressure, and the reaction product was washed with diethyl ether, and by filtration, the catalyst was separated. 10 % Hydrogen chloride in an amount nearly the same as the filtrate was put in the reactor. The reactor was shaken, and the organic layer was taken out. The diethyl ether was distilled off under vacuum to give dimer alcohol having a saponification value of about 10.

(2) Production of dimer alcohol diglycidyl ether

In the same reactor as used in Production Example 1, 543 parts of the dimer alcohol produced as above was reacted with 185 parts of epichlorohydrin by using sulfuric acid as a catalyst by a known method [the method of E. C. Williams et al. in Trans. Am. Inst. Chem. Eng., 37, 157,(1941)]to give a dimer alcohol diglycidyl ether having an epoxy equivalent of about 420.

(3) Production of an epoxy-polyamine resin

An 82% solution of an epoxy-polyamine resin was prepared in the same way as in Production Example 1 except that 565 parts of the above dimer alcohol diglycidyl ether was used. The resin solution was adjusted to a solids concentration of 50% with ethylene glycol monobutyl ether. The resulting solution had a Gardner viscosity (25° C.) of ZY.

PRODUCTION EXAMPLE 4

The same reactor as used in Production Example 1 was charged with 476 parts of polypropylene glycol diglycidyl ether having an epoxy equivalent of about 317, 342 parts of bisphenol A and 36 parts of a methyl isobutyl ketone solution of a ketimine formed between monoethanolamine and methyl isobutyl ketone which contained 80% of available components while blowing nitrogen gas into the reactor. They were reacted at 150° C. until the epoxy groups disappeared.

Furthermore, 665 parts of bisphenol A diglycidyl ether having an epoxy equivalent of 190 and 232 parts of a methyl isobutyl ketone solution of a ketimine formed between monoethanolamine and methyl isobutyl ketone which contained 80% of available components were added to the reaction mixture, and the entire mixture was reacted at 140° C. until the epoxy group concentration reached 0.28 millimole/g.

As a result, a solution of an epoxy resin having a number average molecular weight of about 1,500 was obtained. The epoxy resin solution was diluted and cooled with 365 parts of ethylene glycol monobutyl ether. When its temperature reached 100° C., 100 parts of a methyl isobutyl ketone solution of a methyl isobutyl ketone diketimine of diethylenetriamine containing 80% of available components was added, and the reaction was carried out at 100° C. until the rise of the viscosity ceased. Thus, an epoxy-polyamine resin solution having a solids content of 81% was obtained. When the resin solution was adjusted to a solids concentration of 50% with ethylene glycol monobutyl ether, the Gardner viscosity of the solution (25° C.) was V.

PRODUCTION EXAMPLE 5

The same reactor as used in Production Example 1 was charged with 450 parts of bisphenol A diglycidyl ether modified with ethylene oxide having an epoxy equivalent of about 300 (Glyciale BPE-300; ethylene oxidemodifeid bisphenol A diglycidyl ether having an epoxy equivalent of about 300 produced by Sanyo Chemical Co., Ltd.), 342 parts of bisphenol A, and 36 parts of a methyl isobutyl ketone ketimine of monoethanolamine containing 80% of available components (methyl isobutyl ketone solution) while nitrogen gas was blown into the reactor, and they were reacted at 160° C. until the epoxy groups disappeared.

Furthermore, 665 parts of bisphenol A diglycidyl ether having an epoxy equivalent of about 190 and 232 parts of a methyl isobutyl ketone solution of a methyl isobutyl ketone ketimine of monoethanolamine containing 80% of available components were added to the reaction mixture, and the entire mixture was reacted at 140° C. until the epoxy group concentration reached 0.29 millimole/g.

As a result, a solution of an epoxy resin having a number average molecular weight of about 1,500 was obtained. This solution was then diluted and cooled with 350 parts of ethylene glycol monobutyl ether. When the temperature of the solution reached 100° C., 100 parts of a methyl isobutyl ketone solution of a methyl isobutyl ketone diketimine of diethylene triamine containing 80% of available components was added, and the reaction was carried out at 100° C. until the rise of the viscosity ceased. Thus, a solution of an epoxy-polyamine resin having a solids content of 81% was obtained. When this solution was adjusted to a solids concentration of 50% with ethylene glycol monobutyl ether, its Gardner viscosity (25° C.) was Y.

EXAMPLES 1-3 AND COMPARATIVE EXAMPLES 1-2

Methyl ethyl ketoxime-blocked isophorone diisocyanate was incorporated in each of the five resin solutions obtained in the foregoing Production Examples so that the amount of the blocked isocyanate groups became equivalent to the total amount of the primary hydroxyl groups and primary amino groups in the epoxypolyamine resin.

Furthermore, 1 part of polypropylene glycol (Sunnix PP 4000, a product of Sanyo Chemical Co., Ltd.), 0.96 part of acetic acid and 1 part of lead acetate were added to 100 parts (solids) of each of the resulting resin compositions. The mixture was heated to 60° C. with stirring, and deionized water was gradually added to give an emulsion having a solids concentration of 30% with good stability.

To 100 parts (as solids) of the resulting emulsion were added 3 parts of basic lead silicate, 13 parts of titanium white, 0.3 part of carbon black, 3 parts of clay, 2 parts of dibutyltin oxide and 1 part of a nonionic surfactant (Noigen 142B, a tradename for a product of Daiichi Kogyo Seiyaku Co., Ltd.), and the pigments were dispersed by a ball mill until the particle size became less than 10 micrometers. The dispersion was diluted with deionized water to a resin soilds content of 15%.

The five diluted paints were each applied by cathodic electrodeposition to a non-treated steel plate and to a Bt-3080 (zinc phosphate)-treated steel plate at a bath temperature of 28° C. and a voltage of 250 V for 3 minutes. The coated plates were baked at 160° C. for 20 minutes, and then tested for corrosion resistance.

The resin formulation and the test results are shown in Table 1.

The test results were evaluated on the following scale.

⊙: Hardly any change
○: There was a change in the coated surface, but blisters and flakings were less than 5%
: Blisters and flakings were 5% to less than 10%
Δ: Blisters and flakings were 10% to less than 50%
X: Blisters and flakings were 50% or more The coating resin compositon of this invention comprises as a main component an epoxy-polyamine resin obtained by the addition of an amine compound to an epoxy resin which is obtained by reacting a diepoxide compound resulting from the reaction of a dimer alcohol with an epihalohydrin, with a bisphenol and as required with a bisphenol diglycidyl ether as well, and can form a film having a thickness of at least 35 microns and being free from surface imperfections by electrodeposition under usual conditions (voltage 200 to 300 V, current passing time 1 to 5 minutes). It has excellent thick film coatability and can give a coated film having excellent corrosion resistance. It is suitable for use as a cathodic electrodeposition coating resin composition.

We claim:

1. A coating resin composition comprising as a main component an epoxy-polyamine resin resulting from the addition of (d) an amine compound having active hydrogen to an epoxy resin obtained by reacting (a) a diepoxide compound with less than 1 equivalent, per equivalent of the diepoxide compound (a), of (b) a bis-

TABLE 1

| | | | Run No. | | | | |
|---|---|---|---|---|---|---|---|
| | | | Example | | | Comparative Example | |
| | | | 1 | 2 | 3 | 1 | 2 |
| Resin formulation | Base resin | Type (Production Example) | 1 | 2 | 3 | 4 | 5 |
| | | Solids content (parts) | 84 | 78 | 80 | 84 | 84 |
| | Methylethyl ketoxime-blocked isophorone diisocyanate (parts as solids) | | 16 | 22 | 20 | 16 | 16 |
| Film thickness (microns) (*1) | | | 50 | 45 | 40 | 50 | 22 |
| Coated surface condition | | | ○ | ○ | ○ | ○ | ○ |
| Corrosion resistance tests | Non-treated steel plate | Salt spray resistance (480 hours) (*2) | 2.3 mm | 1.4 mm | 2.7 mm | 4 mm | 5 mm< |
| | | Salt immersion resistance (480 hours) (*3) | ○ | ○ | Δ | X | Δ |
| | Bt-3080 treated steel plate | Salt spray Resistance 1000 hours (*2) | 1 mm> | 1 mm> | 1–2 mm | 5–6 mm | 5–6 mm |
| | | 1500 hours (*2) | 1–2 mm | 1–2 mm | 2–3 mm | — | — |
| | | Salt immersion resistance 800 hours (*3) | ⊙ | ⊙ | ○ | Δ | Δ |

The notes to Table 1.

(*1): The film thickness was the thickness of an electrodeposited film formed when electric current was passed for 3 minutes at 250 V.

(*2): Salt spray resistance

Crosscuts were formed with a knife on the electrodeposited film so that they reached the substrate, and then tested in accordance with JIS Z2371. Rust and blister widths from damage caused by the knife were measured. The testing time was 480 hours for the non-treated steel plate, and 1000 and 1500 hours for the Bt-3080-treated steel plate.

(*3): Salt immersion resistance

The electrodeposition-coated plate was immersed in a 5% aqueous solution of NaCl, and changes in the flat portion were observed. The immersion time was 480 hours for the non-treated steel plate, and 800 hours for the Bt-3080-treated steel plate.

phenol, said diepoxide compound being obtained by reacting a dihydric dimer alcohol derived from an unsaturated fatty acid or aliphatic unsaturated alcohol having 14 to 24 carbon atoms with an epihalohydrin.

2. A coating resin composition comprising as a main component an epoxy-polyamine resin resulting from the addition of (d) an amine compound having active hydrogen to an epoxy resin obtained by reacting (a) a diepoxide compound with more than 1 equivalent, per equivalent of the diepoxide compound (a), of (b) a bisphenol and with (c) bisphenol diglycidyl ether, said diepoxide compound being obtained by reacting a dihydric dimer alcohol derived from an unsaturated fatty acid or aliphatic unsaturated alcohol having 14 to 24 carbon atoms with an epihalohydrin.

3. The composition of claim 1 or 2 in which the dimer alcohol is obtained by reducing the carboxyl groups of a dimeric acid derived from an unsaturated fatty acid having 14 to 24 carbon atoms.

4. The composition of claim 1 or 2 in which the dimer alcohol is a dimerized product of an aliphatic unsaturated alcohol having 14 to 24 carbon atoms.

5. The composition of claim 3 in which the unsaturated fatty acid is selected from the group consisting of myristo-oleic acid, palmito-oleic acid, oleic acid, vaccenic acid, eiconic acid, erucic acid, selacholenic acid, linoleic acid, hiragonic acid, linolenic acid and arachidonic acid.

6. The composition of claim 5 in which the unsaturated fatty acid is oleic acid or linoleic acid.

7. The composition of claim 4 in which the aliphatic unsaturated alcohol is selected from the group consisting of oleyl alcohol, erucyl alcohol, linoleyl alcohol and linolenyl alcohol.

8. The composition of claim 7 in which the aliphatic unsaturated alcohol is oleyl alcohol or linoleyl alcohol.

9. The composition of claim 1 in which 0.1 to 0.9 equivalent of the bisphenol (b) is reacted with 1 equivalent of the diepoxide compound (a).

10. The composition of claim 2 in which the bisphenol (b) is used in an amount of 0.3 to 0.9 equivalent per equivalent of the entire oxirane groups of the diepoxide compound (a) and the bisphenol diglycidyl ether (c).

11. The composition of claim 2 in which the epoxy resin is obtained by reacting the diepoxide compound with the bisphenol (b), and then reacting the product with the bisphenol diglycidyl ether (c).

12. The composition of claim 2 in which the mole ratio of the diepoxide compound (a) to the bisphenol diglycidyl ether (c) is from 1:5 to 5:1.

13. The composition of claim 1 or 2 in which the bisphenol (b) is a compound represented by the following formula

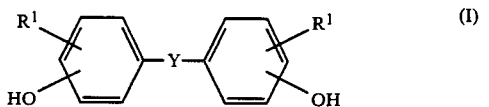

wherein Y represents a direct bond or a lower alkylene group, and $R^1$ represents a hydrogen atom or a lower alkyl group.

14. The composition of claim 1 or 2 in which the bisphenol (b) is selected from the group consisting of bis(4-hydroxyphenyl)-2,2-propane, bis(4-hydroxyphenyl)-1,1-ethane, bis(4-hydroxyphenyl)-methane, 4,4'-dihydroxydiphenyl ether, 4,4'-dihydroxydiphenylsulfone, bis(4-hydroxyphenyl)-1,1-isobutane and bis(4-hydroxy-3-t-butylphenyl)-2,2-propane.

15. The composition of claim 2 in which the bisphenol diglycidyl ether (c) has a number average molecular weight of 340 to 2000 and an epoxy equivalent of 170 to 1000.

16. The composition of claim 2 in which the bisphenol diglycidyl ether (c) is a bisphenol A-type diglycidyl ether represented by the following formula

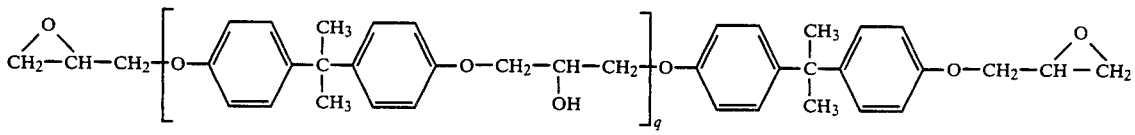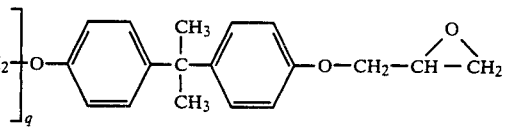

wherein q is a number of 0 to 4.

17. The composition of claim 1 or 2 in which the epoxy resin has a number average molecular weight of 1,200 to 5,000 and an epoxy equivalent of 600 to 2,500.

18. The composition of claim 1 or 2 in which the amine compound has active hydrogen capable of reacting with the oxirane groups of the epoxy resin and can give an amino group or a quaternary ammonium salt group to the epoxy resin.

19. The composition of claim 18 in which the amine compound is a ketiminized product of an amine selected from the group consisting of dialkylenetriamines, dialkanolamines, N-alkylalkanolamines and monoethanolamines.

20. The composition of claim 1 or 2 in which the epoxy-polyamine resin has an amine value of 15 to 100.

21. The composition of claim 1 or 2 which further contains an external crosslinking agent selected from the group consisting of blocked polyisocyanates, polyamine beta-hydroxycarbamates, malonic acid esters, methylolated melamine and methylolated urea.

22. A cathodic electrodeposition bath comprising the composition of claim 1 or 2.

23. An article coated with the composition of claim 1 or 2.

24. A method of coating an article, which comprises subjecting the article to cathodic electrodeposition coating with the composition of claim 1 or 2.

* * * * *